(12) United States Patent
Uhl

(10) Patent No.: US 6,186,546 B1
(45) Date of Patent: Feb. 13, 2001

(54) KNEE BOLSTER

(75) Inventor: Joseph Edward Uhl, Plymouth, MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/292,203

(22) Filed: Apr. 15, 1999

(51) Int. Cl.⁷ .................................................. B60R 21/04
(52) U.S. Cl. ............................................................. 280/751
(58) Field of Search .................... 280/753, 752, 280/751

(56) References Cited

U.S. PATENT DOCUMENTS

| | | | |
|---|---|---|---|
| 3,774,713 | 11/1973 | Stegmaier | 180/90 |
| 3,794,349 | 2/1974 | Fuller | 180/90 |
| 5,190,314 | * 3/1993 | Takasugi | 280/752 |
| 5,456,494 | 10/1995 | Witkovsky | 280/752 |
| 5,697,667 | 12/1997 | Beaudet et al. | 296/189 |
| 6,032,978 | * 3/2000 | Spencer et al. | 280/753 |

FOREIGN PATENT DOCUMENTS

| | | |
|---|---|---|
| 4410041 | 9/1994 | (DE). |
| 2263671 | 8/1993 | (GB). |
| 207252 | 9/1986 | (JP). |

\* cited by examiner

Primary Examiner—Kenneth R. Rice
(74) Attorney, Agent, or Firm—Larry I. Shelton

(57) ABSTRACT

A knee bolster for a motor vehicle includes a knee bolster cover adapted to mount to an instrument panel in an interior of a motor vehicle and at least one hinge member extending from the knee bolster cover for attaching the knee bolster cover to the instrument panel and to allow the knee bolster cover to rotate relative to the instrument panel.

20 Claims, 2 Drawing Sheets

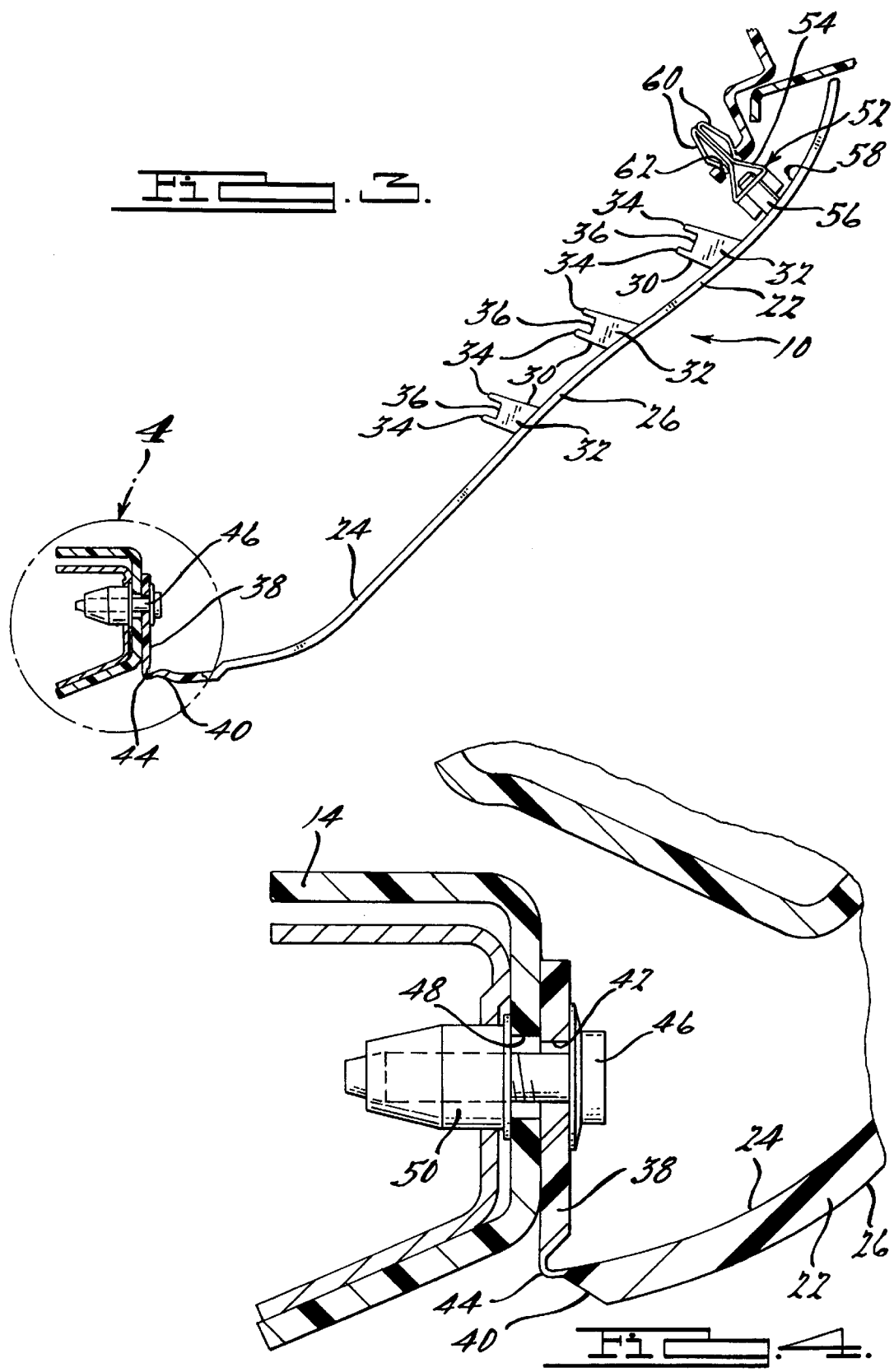

KNEE BOLSTER

BACKGROUND OF THE INVENTION

1. Field of the Invention

The present invention relates generally to knee bolsters for vehicles and, more specifically, to a driver's side knee bolster for an instrument panel on a motor vehicle.

2. Description of the Related Art

Knee bolsters are employed as interior components on motor vehicles. Typically, the knee bolster is mounted to an instrument panel on the motor vehicle. During a frontal impact of the motor vehicle, the knee bolster provides a first contact surface for knees of a seated occupant and to aid in cushioning and directing the knees. The knee bolster also provides energy management of a lower torso of the occupant and load transmission to other members, for example, energy absorption brackets and the support structure for the instrument panel (IP).

Typically, the knee bolster for a driver's side vehicle application also functions as a steering column cover for a steering column opening in the IP. The steering column cover is a separate end-item assembly. The steering column cover is shipped directly to the assembly plant as a loose item to allow the steering column to be checked and attached to the IP before the steering column cover can be attached. Typically, the steering column cover is attached with screws and/or clips to the IP. Because the steering column cover is not part of the IP shipped to the assembly plant, a "tie strap" or support strap is usually used to secure and hold the steering column opening together during shipping. During assembly, the support strap is either left in or removed and discarded once the steering column is in place. The steering column cover is secured to the IP to provide the necessary support for the steering column opening.

Although the above knee bolster or steering column cover has worked well, it is desirable to provide a knee bolster with a hinge to allow rotation of the knee bolster relative to the IP. It is also desirable to provide a knee bolster for an IP that eliminates the use of a support strap and is lower in cost. It is still desirable to provide a knee bolster attached to the IP that can be shipped as part of the IP from the manufacturing to the assembly plant. It is further desirable to provide an improved fit and finish between the knee bolster and the instrument panel.

SUMMARY OF THE INVENTION

Accordingly, the present invention is a knee bolster for a motor vehicle including a knee bolster cover adapted to mount to vehicle structure in an interior of a motor vehicle. The knee bolster also includes at least one hinge member extending from the knee bolster cover for attaching the knee bolster cover to the vehicle structure and to allow the knee bolster cover to rotate relative to the vehicle structure.

One advantage of the present invention is that a new knee bolster is provided for a motor vehicle having a hinge to allow the knee bolster cover to rotate relative to the instrument panel. Another advantage of the present invention is that the knee bolster is attached to the instrument panel at the manufacturing plant and serves as part of the steering column opening, eliminating the use and cost of a support strap. Yet another advantage of the present invention is that a living hinge is provide on the knee bolster and improves fit and finish between the knee bolster and the instrument panel. Still another advantage of the present invention is that the knee bolster has improved quality since the knee bolster stays attached to the instrument panel and is not subject to assembly plant handling and damage. A further advantage of the present invention is that the knee bolster saves labor costs and reduces in plant complexity because the knee bolster is no longer a separate attachment and comes with the instrument panel as part of the instrument panel assembly. Yet a further advantage of the present invention is that the knee bolster eliminates the need for a separate fuse panel access door or cover because the fuses can be packaged behind the knee bolster and the knee bolster swung down for access.

Other features and advantages of the present invention will be readily appreciated as the same becomes better understood after reading the subsequent description when taken in conjunction with the accompanying drawings.

BRIEF DESCRIPTION OF THE DRAWINGS

FIG. 3 is a fragmentary side elevational view of the knee bolster and a portion of the instrument panel of FIG. 1.

FIG. 4 is an enlarged view of a portion in circle 4 of FIG. 3.

DESCRIPTION OF THE PREFERRED EMBODIMENT(S)

Figure 1:
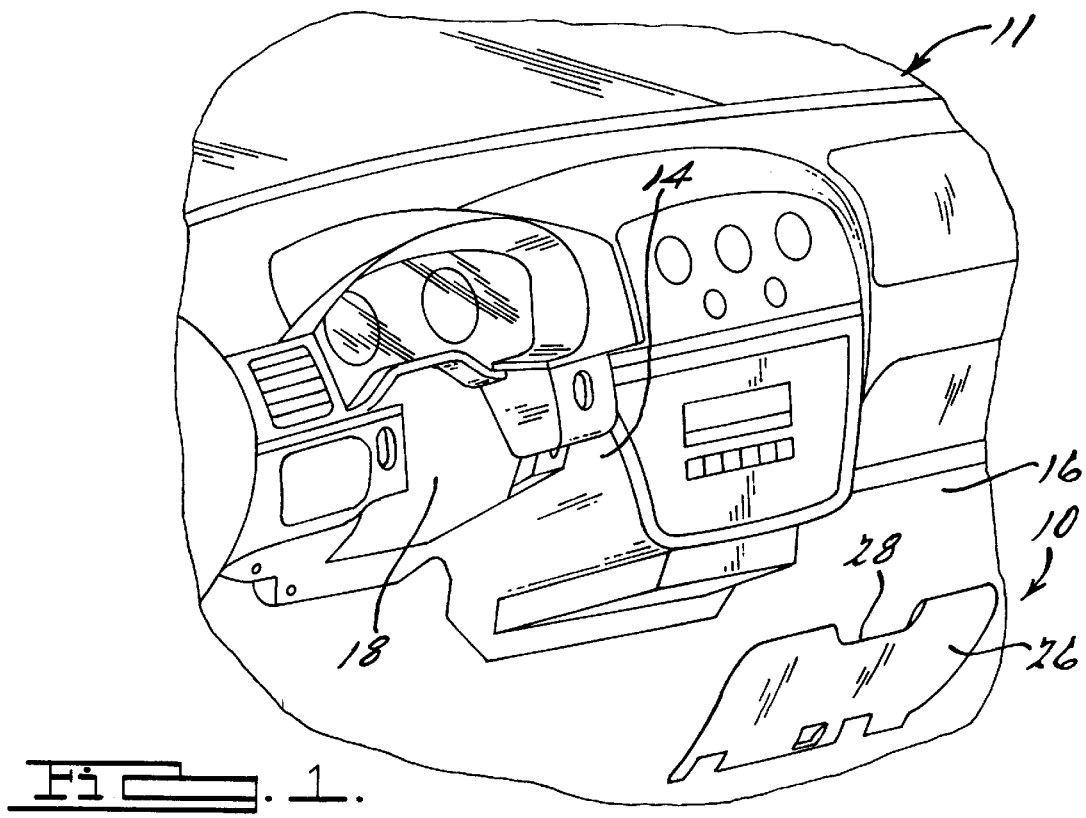
FIG. 1 is an exploded perspective view of a knee bolster, according to the present invention, illustrated in operational relationship with an instrument panel of a motor vehicle.
Figure 2:
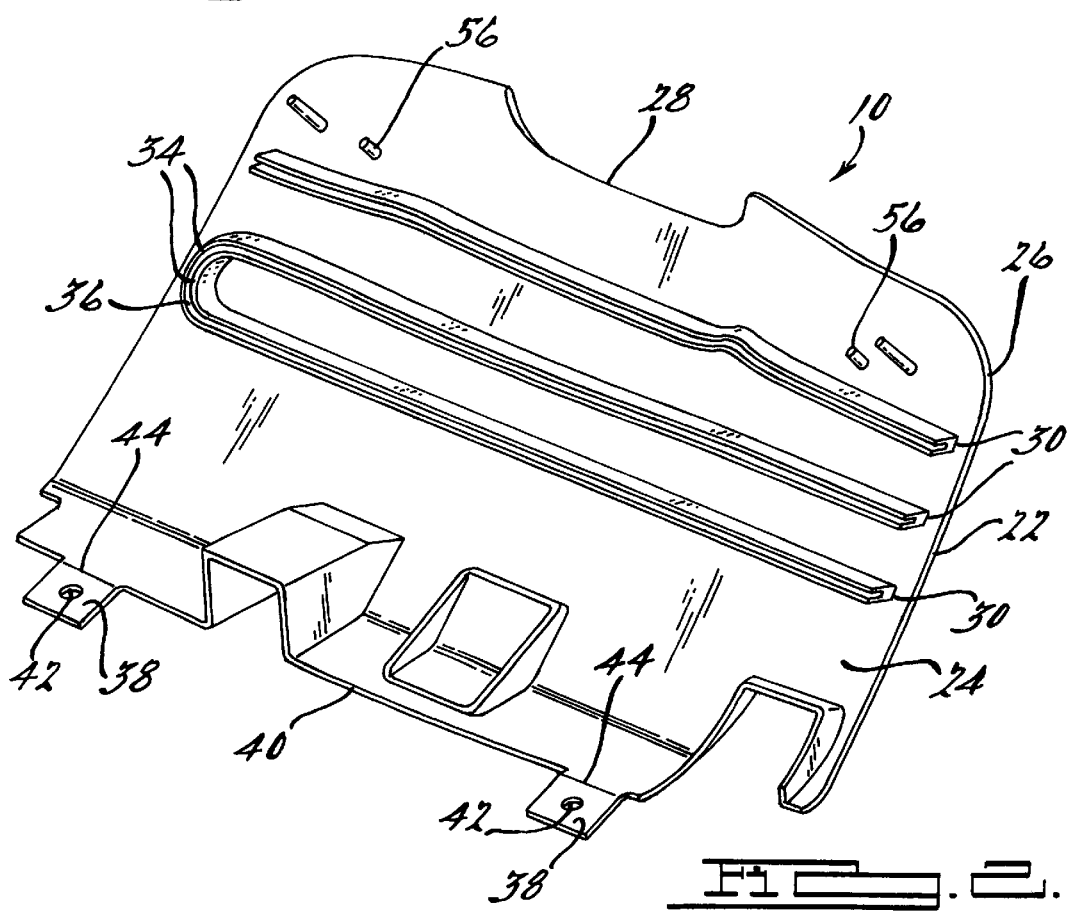
FIG. 2 is a perspective view of the knee bolster of FIG. 1.

Referring now to the drawings and in particular FIG. 1 and 2, one embodiment of a knee bolster 10, according to the present invention, is shown for a motor vehicle, generally indicated at 11. The knee bolster 10 is adapted to mount to vehicle structure such as an instrument panel 14 in an interior or occupant compartment 16 of the motor vehicle 11. The knee bolster 10 can be employed to mount any number of places on the instrument panel 14 to provide a first contact surface for knees of a seated occupant (not shown) and to aid in cushioning and directing the knees of the occupant in the motor vehicle 11. In FIG. 1, the location of the knee bolster 10 is for a driver's side application and is also referred to as a steering column cover because it closes a steering column opening 18 in the instrument panel 14.

In the occupant compartment 16 of the motor vehicle 11, the knee bolster 10 helps to define the interior or occupant compartment 16 and is often referred to as class "A" surface. Class "A" surfaces must meet strict aesthetic requirements, including requirements for fit and finish of the motor vehicle 11. Thus, in the environment depicted in the drawings, the knee bolster 10 is mounted to one side of the instrument panel 14 on the motor vehicle 11. It should be appreciated that the instrument panel 14 is conventional and known in the art.

Referring to FIGS. 1 through 3, the knee bolster 10 includes a knee bolster cover 22 having a front surface 24 and a rear surface 26. The knee bolster cover 22 is generally rectangular in shape and includes a cut-out 28 for a steering column (not shown) to extend through when the knee bolster 10 is attached to the instrument panel 14. The knee bolster cover 22 is made of a thermoplastic resin material such as polypropylene. It should be appreciated that the rear surface 26 of knee bolster cover 22 presents a class "A" surface.

The knee bolster 10 also includes at least one, preferably a plurality of reinforcing members 30 integrally molded to the knee bolster cover 22. The reinforcing members 30 extend transversely along the front surface 24 of the knee bolster cover 22 and are spaced longitudinally or vertically. The reinforcing members 30 each have a generally rectangular base 32 extending longitudinally. The reinforcing members 30 each have a pair of opposed upper flanges 34 extending upwardly from the base 32 to form a channel 36 therebetween. The reinforcing members 30 are made of a thermoplastic resin material, preferably the same thermoplastic resin material as the knee bolster cover 22. It should be appreciated that the reinforcing members 30 may have any suitable shape. It should also be appreciated that the knee bolster cover 22 and reinforcing members 30 are integral, unitary and formed as one-piece.

The knee bolster 10 includes at least one, preferably a plurality of attachment members 38 for attachment to the instrument panel 14. The attachment members 38 are generally rectangular in shape and are spaced transversely along a lower portion 40 of the knee bolster cover 22. The attachment members 38 have at least one aperture 42 extending therethrough for a function to be described. It should be appreciated that the attachment members 38 may have any suitable shape.

The knee bolster 10 includes a hinge 44 extending between the knee bolster cover 22 and each of the attachment members 38 to allow the knee bolster cover 22 to rotate relative to the attachment members 38. The hinge 44 extends transversely and has a thickness less than a thickness of the knee bolster cover 22 and attachment member 38 to form a "living hinge". As a living hinge, the hinge 44 flexes to allow rotation between the attachment member 38 and knee bolster cover 22. The hinge 44 is made of a thermoplastic resin material preferably the same thermoplastic resin material, as the knee bolster cover 22. It should be appreciated that the knee bolster cover 22, hinge 44 and attachment member 38 are integral, unitary and formed as one-piece.

The knee bolster 10 includes at least one fastener 46 for fixedly securing each of the attachment members 38 to the instrument panel 14. Preferably, the fastener 46 is a screw that extends through the aperture 42 in the attachment member 38 and an aperture 48 in the instrument panel 14 and engages a lock nut 50. It should be appreciated that the fastener 46 and lock nut 50 are conventional and known in the art. It should also be appreciated that the fastener 46 is hidden from view by the knee bolster cover 22.

The knee bolster 10 also includes a clip attachment, generally indicated at 52, to releasably attach the knee bolster cover 22 to the instrument panel 14. The clip attachment 52 has a clip 54 disposed over a projection 56 extending from an upper portion 58 of the knee bolster cover 22. The clip 54 has a pair of flexible fingers 60 extending outwardly that extend through an aperture 62 in the instrument panel 14. The fingers 60 flex toward each other to extend through the aperture 62 and expand once through to prevent exiting the aperture 62. It should be appreciated that the clip 54 is conventional and known in the art.

To assemble the knee bolster 10, the fasteners 46 are extended through the apertures 42 in the attachment members 38 and the apertures 48 in the instrument panel 14 and engage the lock nuts 50 to fixedly secure the attachment members 38 to the instrument panel 14. The knee bolster cover 22 is rotated upward via the hinges 44 toward the instrument panel 14. The clips 54 of the attachments 52 extend through the apertures 62 in the instrument panel 14 to releasably attach the knee bolster cover 22 to the instrument panel 14. To install the steering column (not shown), the clips 54 of the clip attachments 52 are flexed to release the upper portion 58 of the knee bolster cover 22 from the instrument panel 14 and the knee bolster cover 22 is rotated via the hinges 44 downwardly away from the instrument panel 14. After the steering column is installed, the knee bolster cover 22 is rotated via the hinges 44 upwardly toward the instrument panel 14 and the clips 54 of the clip attachments 52 are flexed to extend through the apertures 62 in the instrument panel 14 to latch the knee bolster cover 22 to the instrument panel 14.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A knee bolster for a motor vehicle comprising:

a knee bolster cover adapted to mount to vehicle structure in an interior of a motor vehicle; and at least one living hinge member extending from said knee bolster cover for attaching said knee bolster cover to the vehicle structure and to allow said knee bolster cover to rotate relative to the vehicle structure.

2. A knee bolster as set forth in claim 1 wherein said at least one living hinge member comprises an attachment member for attachment to the vehicle structure and a living hinge extending between said knee bolster cover and said attachment member.

3. A knee bolster as set forth in claim 1 wherein said knee bolster cover has an upper portion and a lower portion, said at least one living hinge member extending from said lower portion.

4. A knee bolster as set forth in claim 1 including at least one clip attachment extending from said knee bolster cover for releasably attaching said knee bolster cover to the vehicle structure.

5. A knee bolster as set forth in claim 1 including at least one fastener for fixedly attaching said at least one hinge member to the vehicle structure.

6. A knee bolster as set forth in claim 1 including at least one reinforcing member extending transversely along said knee bolster cover.

7. A knee bolster as set forth in claim 1 wherein said at least one living hinge member and said knee bolster cover are integral, unitary and formed as one-piece.

8. A knee bolster as set forth in claim 1 wherein said knee bolster is made of a plastic material.

9. A knee bolster for a motor vehicle comprising:

a knee bolster cover adapted to mount to vehicle structure in an interior of a motor vehicle; and at least one hinge member extending from said knee bolster cover for attaching said knee bolster cover to the vehicle structure and to allow said knee bolster cover to rotate relative to the vehicle structure;

wherein said at least one hinge member has a thickness less than a thickness of said knee bolster cover.

10. A knee bolster for a motor vehicle comprising:

a knee bolster cover adapted to mount to an instrument panel in an interior of the motor vehicle;

a plurality of attachment members for attaching said knee bolster cover to the instrument panel; and a hinge extending between said knee bolster cover and each of said attachment members to allow said knee bolster cover to rotate relative to the instrument panel;

wherein said hinge has a thickness less than a thickness of said knee bolster cover and said attachment members.

11. A knee bolster for a motor vehicle comprising:
a knee bolster cover adapted to mount to an instrument panel in an interior of the motor vehicle;
a plurality of attachment members for attaching said knee bolster cover to the vehicle structure; and
a living hinge extending between said knee bolster cover and each of said attachment members to allow said knee bolster cover to rotate relative to said attachment members.

12. A knee bolster as set forth in claim 11 wherein said knee bolster cover has an upper portion and a lower portion, said living hinge extending from said lower portion.

13. A knee bolster as set forth in claim 11 including at least one clip attachment extending from said knee bolster cover for releasably attaching said knee bolster cover to the vehicle structure.

14. A knee bolster as set forth in claim 11 wherein said knee bolster is made of a plastic material.

15. A knee bolster as set forth in claim 11 including at least one fastener for fixedly attaching each of said attachment members to the vehicle structure.

16. A knee bolster as set forth in claim 11 including at least one reinforcing member extending transversely along said knee bolster cover.

17. A knee bolster as set forth in claim 11 wherein said attachment members, said living hinge and said knee bolster cover are integral, unitary and formed as one-piece.

18. A knee bolster for a motor vehicle comprising:
a knee bolster cover adapted to mount to one side of an instrument panel in an interior of the motor vehicle;
a plurality of attachment members for attaching said knee bolster cover to the instrument panel; and
a living hinge extending between a lower portion of said knee bolster cover and each of said attachment members to allow said knee bolster cover to rotate relative to said attachment members.

19. A knee bolster for a motor vehicle comprising:
a knee bolster cover adapted to mount to vehicle structure in an interior of a motor vehicle;
at least one hinge member extending from said knee bolster cover for attaching a lower portion of said knee bolster cover to the vehicle structure to allow said knee bolster cover to rotate relative to the vehicle structure; and
at least one clip extending from said knee bolster cover to releasably attach an upper portion of said knee bolster cover to the vehicle structure.

20. A knee bolster for a motor vehicle comprising:
a knee bolster cover adapted to mount to vehicle structure in an interior of a motor vehicle;
at least one hinge member extending from said knee bolster cover for attaching a lower portion of said knee bolster cover to the vehicle structure to allow said knee bolster cover to rotate relative to the vehicle structure; and
at least one clip extending from said knee bolster cover and having a plurality of flexible fingers to extend through an aperture in the vehicle structure to releasably attach an upper portion of said knee bolster cover to the vehicle structure.

* * * * *